(12) United States Patent
Tambe et al.

(10) Patent No.: US 8,123,413 B2
(45) Date of Patent: Feb. 28, 2012

(54) SURFACE TEXTURED ROLLERS

(75) Inventors: Nikhil Subhashchandra Tambe, Karnataka (IN); Munishwar Ahuja, Karnataka (IN); Hombe Gowda, Karnataka (IN)

(73) Assignee: General Electric Company, Schenectady, NY (US)

( * ) Notice: Subject to any disclaimer, the term of this patent is extended or adjusted under 35 U.S.C. 154(b) by 63 days.

(21) Appl. No.: 12/649,510

(22) Filed: Dec. 30, 2009

(65) Prior Publication Data

US 2011/0156399 A1 Jun. 30, 2011

(51) Int. Cl.
*F16C 33/34* (2006.01)
*F16C 19/30* (2006.01)

(52) U.S. Cl. .................................. 384/565; 384/619

(58) Field of Classification Search .................. 384/284, 384/565, 566–568, 619
See application file for complete search history.

(56) References Cited

U.S. PATENT DOCUMENTS

| 4,323,401 A | | 4/1982 | Belke et al. | |
|---|---|---|---|---|
| 4,619,534 A | | 10/1986 | Daly et al. | |
| 5,120,325 A | | 6/1992 | Dow, Jr. | |
| 5,441,439 A | | 8/1995 | Grimm et al. | |
| 5,498,096 A | | 3/1996 | Johnson | |
| 5,630,953 A | | 5/1997 | Klink | |
| 5,683,183 A | | 11/1997 | Tanaka et al. | |
| 5,834,094 A | * | 11/1998 | Etsion et al. | 428/156 |
| 5,967,672 A | * | 10/1999 | Akamatsu et al. | 384/516 |
| 6,002,100 A | * | 12/1999 | Etsion | 219/121.71 |
| 6,046,430 A | * | 4/2000 | Etsion | 219/121.71 |
| 6,371,656 B1 | * | 4/2002 | De Vries et al. | 384/565 |
| 6,409,389 B1 | | 6/2002 | Kadokura et al. | |
| 6,655,845 B1 | * | 12/2003 | Pope et al. | 384/492 |
| 6,739,238 B2 | | 5/2004 | Ushijima et al. | |
| 2005/0281496 A1 | * | 12/2005 | Takahashi et al. | 384/13 |
| 2006/0182377 A1 | * | 8/2006 | Akamatsu | 384/492 |
| 2008/0140349 A1 | * | 6/2008 | Behera et al. | 702/182 |

FOREIGN PATENT DOCUMENTS

| JP | 1224519 A | 9/1989 |
|---|---|---|
| JP | 2000205267 A | 7/2000 |
| JP | 2008095903 A | 4/2008 |

OTHER PUBLICATIONS

Marlan et al., "Theoretical and experimental analysis of a partially textured thrust bearing with square dimples," IMechE, 2007, 8 pages, vol. 221 Part J: J. Engineering Tribology.

Nanbu et al., "Micro-Textures in Concentrated Conformal-Contact Lubrication: Effects of Texture Bottom Shape and Surface Relative Motion," Springer, 2008, 12 pages.

Tala-Ighil et al., "Effects of surface texture on journal-bearing characteristics under steady-state operating conditions," IMechE, 2007, 12 pages, vol. 221 Part J:J. Engineering Tribology.

* cited by examiner

*Primary Examiner* — James Pilkington
(74) *Attorney, Agent, or Firm* — Hoffman Warnick LLC; Ernest G. Cusick

(57) ABSTRACT

A surface textured roller and a surface textured rolling element bearing comprising a plurality of micropores in a surface thereof is presented. The plurality of micropores may have a geometry selected from a hemisphere, a diamond shape, an ellipsoid, and a cone. The surface textured rollers may be used, for example, in a gear box and/or a wind turbine drivetrain.

20 Claims, 8 Drawing Sheets

SURFACE TEXTURED ROLLERS

BACKGROUND OF THE INVENTION

The invention relates generally to rollers having surface textures, and more particularly, surface textured rollers and surface textured rolling element bearings for use in, for example, a wind turbine drivetrain.

Typically, turbine drivetrain rollers, and other drivetrain articles therein are subjected to high loads and stresses during operation of the turbine drivetrain. The drivetrain rollers and articles therein may have defects, may fail over time, or they may simply wear out. For example, the loads and stresses that are imposed on the drivetrain rollers and articles therein may exceed acceptable limits, leading to failure or damage to the drivetrain bearings and/or articles therein. The damaged or failed components may be replaced once their existence is known. Alternately, the drivetrain rollers and/or articles therein may simply begin to show wear through prolonged use.

Coatings or lubricants may be used in drivetrains and/or articles therein to provide lubrication and reduce friction between drivetrain rollers and/or articles therein. One example of such an application is in wind turbine drivetrains. Meshing gears and rollers of the aforementioned may operate under conditions such as lower speeds and higher loads. Lubrication phenomenon is transient in nature in such applications. Lubrication phenomenon relates to the formation and maintenance of a minimum essential lubricant film thickness for reliable operation of components operating in boundary and mixed regimes of lubrication. During transient conditions such as emergency stops of the wind turbine drivetrain, the drivetrain gears, the drivetrain rollers, and/or other articles therein are subjected to further loads.

BRIEF DESCRIPTION OF THE INVENTION

A first aspect of the disclosure provides a surface textured roller comprising: a plurality of micropores in a surface thereof, the plurality of micropores having at least a geometry selected from at least one of the group consisting of a hemisphere, a diamond shape, an ellipsoid, and a cone, and combinations thereof.

A second aspect of the disclosure provides a surface textured rolling element bearing comprising: an outer race; an inner race; and a plurality of rollers between the outer race and the inner race, the plurality of rollers having a plurality of micropores in a surface thereof, the plurality of micropores having at least a geometry selected from at least one of the group consisting of a hemisphere, a diamond shape, an ellipsoid, and a cone, and combinations thereof.

A third aspect of the disclosure provides a gearbox comprising: a gearbox including a gear set disposed within the gearbox, the gear set including at least two gears meshing with one another; and a surface textured roller element bearing element supporting the gear set, the surface textured rolling element bearing comprising: an outer race; an inner race; and a plurality of rollers between the outer race and the inner race, the plurality rollers having a plurality of micropores in a surface thereof, the plurality of micropores having at least a geometry selected from at least one of the group consisting of a hemisphere, a diamond shape, an ellipsoid, and a cone, and combinations thereof.

A fourth aspect of the disclosure provides a wind turbine comprising: a rotor; a generator operable to generate power; a gearbox provided between the rotor and the generator, the gearbox including a gear set disposed within the gearbox, the gear set including at least two gears meshing with one another; and a surface textured rolling element bearing supporting the gear set, the surface textured rolling element bearing comprising: an outer race; an inner race; and a plurality of rollers between the outer race and the inner race, the plurality of rollers having a plurality of micropores in a surface thereof, the plurality of micropores having at least a geometry selected from at least one of the group consisting of a hemisphere, a diamond shape, an ellipsoid, and a cone, and combinations thereof.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

DETAILED DESCRIPTION

It has been discovered that an advantage that may be realized in the practice of some embodiments of the surface textured rollers and the surface textured rolling element bearings described herein is that drivetrain rollers having surface textures, such as micropores, maintain improved lubrication between the rollers, gears, and other drivetrain articles therein in contact with the surface textured bearings. Another advantage that may be realized in some embodiments of the surface textured rollers and the surface textured rolling element bearings described herein is that the surface textured rollers address problems associated with lubrication under extreme operating conditions due to the texturing itself. The textured surface enhances lubrication even in an operating regime where there is high stress causing elastic deformation of mating surfaces between the surfaced textured rollers and engine articles therein.

Another advantage that may be realized in some embodiments of the surface textured rollers and the surface textured rolling element bearings described herein is that the surface textured rollers reduce frictional stress by improving the lubrication film integrity, life, and efficiency. Embodiments of the surface textured rollers improve lubrication depending on the availability of the lubricant and enhance performance of drivetrain articles with rolling and/or sliding contacts between them. For starved conditions where insufficient lubricant prevents formation of a film, the surface textures help pin lubricant droplets to the roller surface due to surface tension effect. These droplets in turn take up the frictional load and thus aid in the lubrication. The pinning down of droplets does not require very high speeds and the speed independent film forming capability is unlike conventional lubrication such as for example in journal bearings or ball bearings.

For conditions where the lubricant supply is abundant but the combination of frictional load, drivetrain speed, and roller geometry is not enough to sustain a film, the surface textures act as reservoirs for the lubricant and help increase pressure in the film so that it can be sustained even under adverse conditions. The surface textures acting as reservoirs provide for an effective means for lubrication and is virtually equivalent to a transition from a boundary lubricated regime to an elastohydrodynamic or even hydrodynamic lubrication regime.

It has also been discovered that another advantage that may be realized in some embodiments of the surface textured rollers and the surface textured rolling element bearings described herein is that the reduced frictional stress due to improved lubrication allows for the design of a more efficient turbine drivetrain, drivetrain articles therein, and/or other mechanical systems where bearings are used, such as a gearbox and a wind turbine as well as secondary systems such as lubrication pumps and cooling systems.

Figure 1:
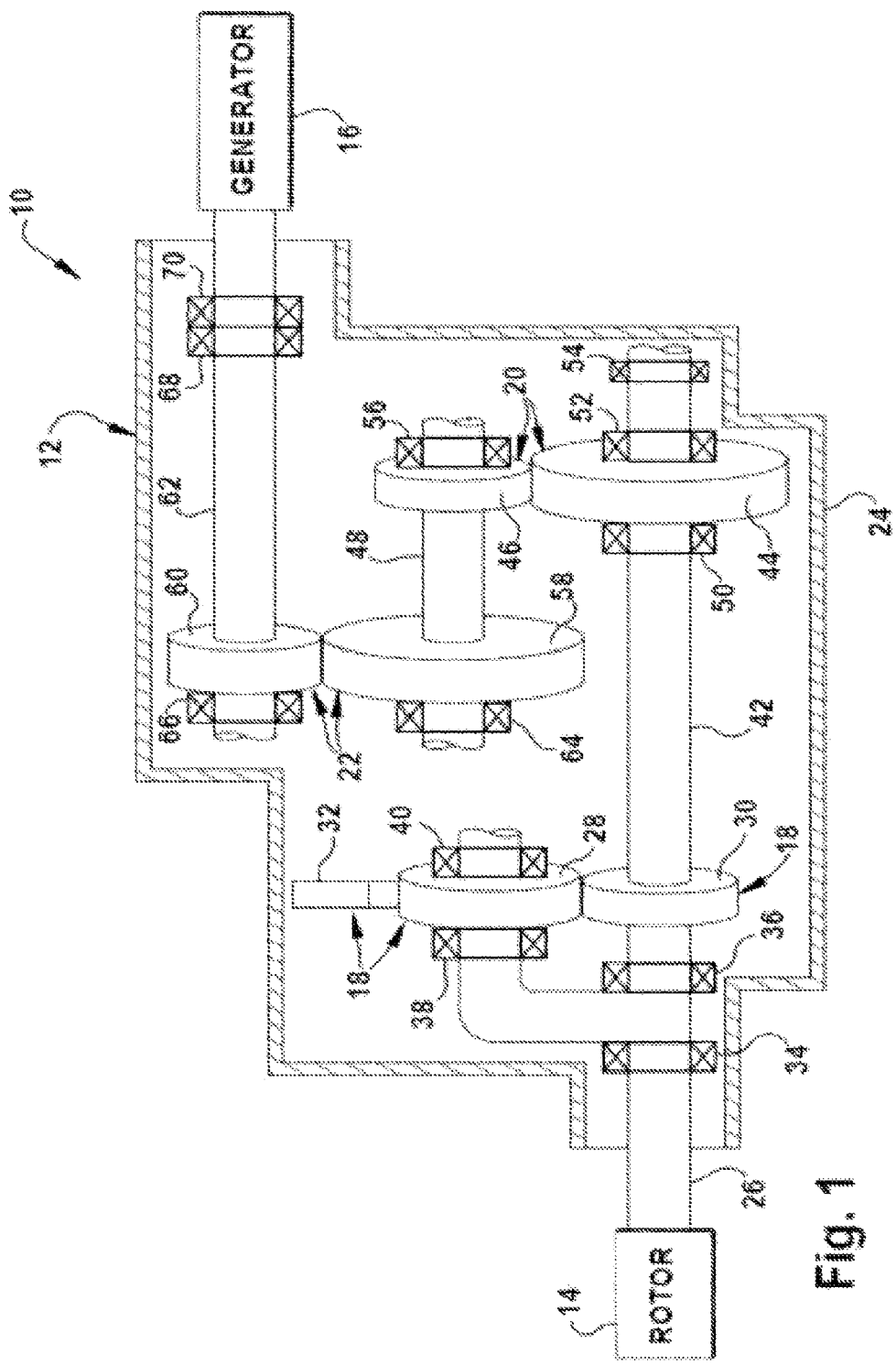
FIG. 1 shows a schematic view of an embodiment of a rotating electric machine, in accordance with the present invention.

Referring to FIG. 1, a schematic view of an embodiment of a rotating electric machine 10 is shown. In an embodiment, the rotating electric machine 10 may include a wind turbine drivetrain and hereon in will have the reference numeral 10 unless otherwise noted. Wind turbine drivetrain 10 may comprise a gearbox 12 provided between a rotor 14 and a generator 16. Rotor 14 may have a plurality of blades (not shown). As wind blows, rotor 14 may be rotated due to the force of the wind. The speed of rotation of rotor 14 may vary as a function of the wind speed. The rotation of rotor 14 may be transmitted via gearbox 12 to the rotor of generator 16. Rotor 14 may be designed to transfer wind energy into rotation efficiently. However, the rotor of generator 16 may be designed to increase the speed of rotation produced by rotor 14 to the more desirable speed for driving the rotor of generator 16.

In an embodiment, gearbox 12 may comprise a planetary gear set 18, an intermediate gear set 20, and a high-speed gear set 22 provided inside a gearbox housing 24. Rotor 14 may be coupled via a rotor shaft 26 to planetary gear set 18. Planetary gear set 18 may comprise a planetary gear 28, a sun gear 30, and a ring gear 32. Ring gear 32 may extend around sun gear 30 and may have teeth around its inner circumference. Sun gear 30 may also have teeth around its outer circumference. The teeth of planetary gear 28 mesh with the teeth of sun gear 30 and ring gear 32. In addition, planetary gear 28 may be coupled to rotor shaft 26. As rotor 14 rotates rotor shaft 26, planetary gear 28 may be driven around sun gear 30 causing sun gear 30 to rotate. Planetary gear set 18 may be supported by a plurality of surface textured rolling element bearings 34, 36, 38, and 40 described herein.

Sun gear 30 may be coupled via a first gear shaft 42 to intermediate gear set 20. In an embodiment, sun gear 30 may be smaller than planetary gear 28 and may rotate at a speed greater than rotor shaft 26. Therefore, gear shaft 42 may also rotate at a speed greater than rotor shaft 26. Intermediate gear set 20 may comprise a first intermediate gear 44 and a second intermediate gear 46 that may cooperate to increase the speed of rotation further. Second intermediate gear 46 is coupled to a second gear shaft 48 which may be coupled to high-speed gear set 22. In an embodiment, first intermediate gear 44 may be larger than second intermediate gear 46 so that second intermediate gear 46 rotates at a speed greater than first gear shaft 42. Intermediate gear set 20 may also be supported by a plurality of surfaced textured rolling element bearings 50, 52, 54, and 56 described herein.

High-speed gear set 22 may comprise a first high-speed gear 58 and a second high-speed gear 60 that may cooperate to increase the speed of rotation still further. Second high-speed gear 50 may be coupled to generator 16 via an output shaft 62. High-speed gear set 22 may be supported via corresponding surface textured rolling element bearings 64, 66, 68, and 70 described herein. First high-speed gear 58 may be larger than second high-speed gear 60. Therefore, second high-speed gear 60 may rotate at a speed greater than first high-speed gear 58. Consequently, output shaft 62 may rotate at a speed greater than second gear shaft 48. Generator 16 may convert the rotational energy of output shaft 62 into electricity.

Friction, wear, and lubrication are illustrative parameters to control for enhanced life and reliable operation of many mechanical components. For low speed and high load tribological applications with rolling and/or sliding contact, such as between rollers and engine articles therein, for example in a wind turbine gearbox, generating an appropriate film thickness for a lubricant is difficult and is thus a factor when designing the aforementioned components for longer life. In an illustrated embodiment, see FIG. 1, each surface textured rolling element bearing (34, 36, 38, 40, 50, 52, 54, 56, 64, 66, 68, and 70) includes one or more dimpled surfaces configured to hold lubricant for providing lubrication.

As described herein, "dimpled" may be referred to as a surface having a plurality of micropores or grooves formed in a predetermined pattern. The pattern may vary depending on the application of the roller. In an embodiment, the pores may be micro-sized pores configured to hold lubricant for enhanced lubrication. Surface texture in the form of pores on a roller surface is an effective means for lubrication under conditions of elastic deformation of contact surfaces. As a result, friction and wear are substantially reduced. Additional details pertaining to dimpled roller surfaces are explained in detail herein.

In an embodiment, the surface textured rolling element bearings referred in FIG. 1 may be surface textured rolling element bearings described herein or rolling element bearings that may be capable of having the surface textured with micropores, as described herein. In an embodiment, the rotating electric machine 10, and in particular, the wind turbine drivetrain described in FIG. 1 having the surface textured rolling element bearings is not meant to limit the application (s) of the surface textured rolling element bearings described herein. The surface textured rolling element bearings of the present invention are not limited to any one particular machine and may be used in other applications where a high frictional load-low engine speed environment exists such as a drive train in a turbine; a cement, a sugar, and/or a paper mill; an off-highway vehicle; and a marine engine and/or drivetrain.

Figure 2:
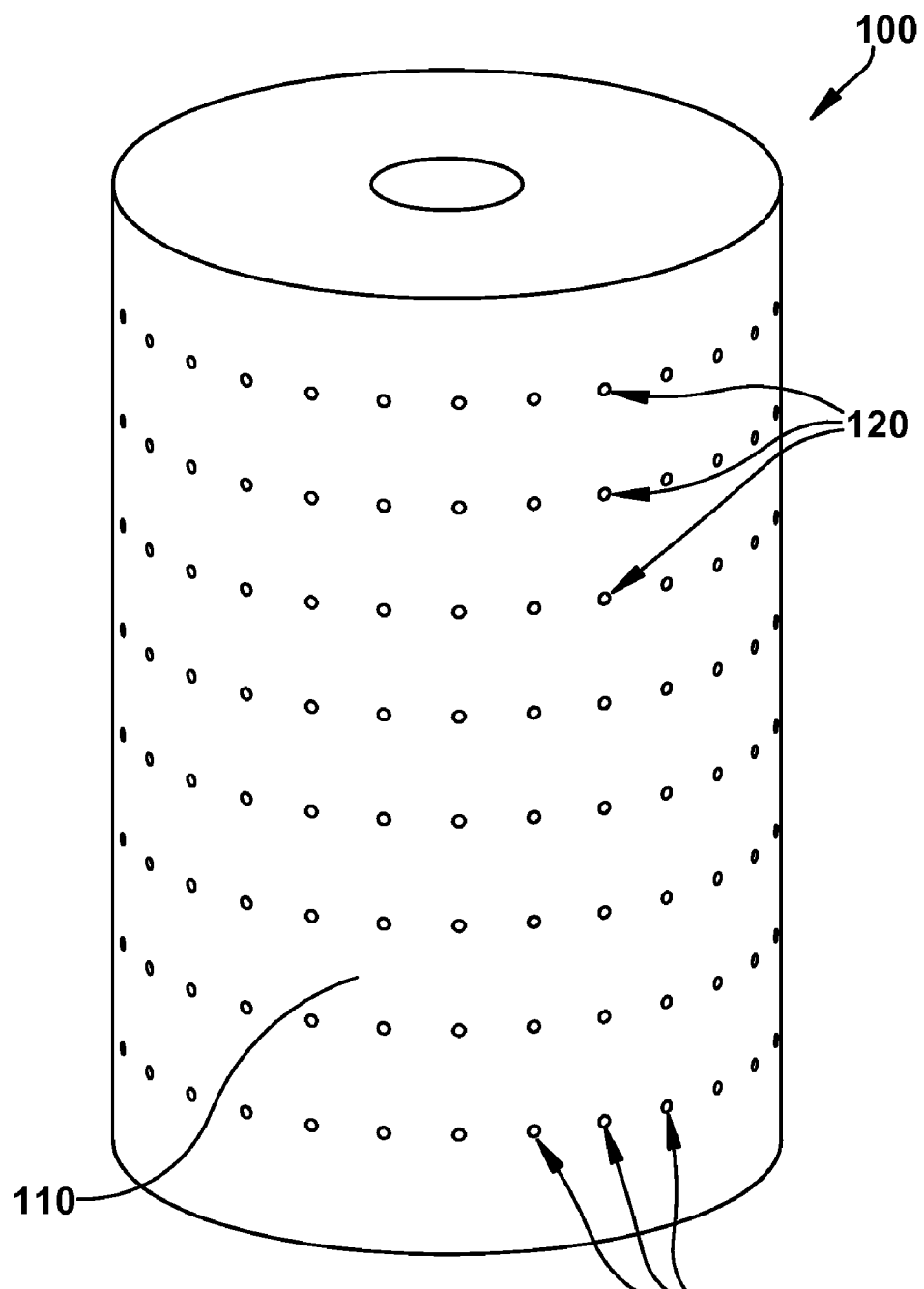
FIG. 2 shows a perspective view of an embodiment of a surface textured roller, in accordance with the present invention.

Referring to FIG. 2, an embodiment of a surface textured roller is shown. As discussed herein, roller 100 may have a surface 110 having a plurality of micropores 120 therein configured to hold lubricant for providing lubrication between roller 100 and an article in contact with it. In an embodiment, roller 100 may be configured to hold lubricant for providing lubrication between roller 100 and an article in contact with it under high frictional load and low speed conditions. In an embodiment, micropores 120 may have at least a geometry selected from at least one of the group consisting of a hemisphere, an ellipsoid, a cone, and a diamond shape (see FIG. 4, FIG. 5, FIG. 6, and FIG. 7 respectively), and combinations thereof. In another embodiment, micropores 120 may have hemisphere or diamond shaped geometry.

In an embodiment, roller 100 may have dimensions of approximately 7 cm wide, approximately 34.3 cm bore, and approximately 45.7 cm outer diameter. The foregoing embodiment is not meant to limit the size of the surface textured roller. The size of the surface textured roller of the present invention is not limited to any one particular size and any size surface textured roller that may be used in applications where a high frictional load and low speed condition exists is encompassed by the present invention.

An advantage that may be realized in the practice of some embodiments of the surface textured roller is that the surface texturing in the form of micropores 120 may enhance lubrication by providing improved availability of the lubricant. During operating conditions when the supply of lubricant is often limited, micropores 120 may hold the lubricant at the micropore regions on the surface 110 due to a surface tension effect. Another advantage that may be realized in an embodiment, during operating conditions when the supply of lubricant is generally abundant, but a combination of load, speed, and geometry of roller 100 is not sufficient to sustain a lubricant film between roller 100 and an article it may be in contact with, micropores 120 may act as reservoirs of lubricant. As a result, a lubricant film is sustained between roller 100 and the article it may be in contact with even under adverse operating conditions of the machine.

Even though the surface texture of an embodiment of the surface textured roller is explained in detail with reference to a general roller 100, the surface texture is equally applicable to other surface textured rollers. In an embodiment, such rollers may be selected from the group consisting of a cylindrical roller, a spherical roller, and a taper roller. In another embodiment, the surface textured roller may be a cylindrical roller.

Figure 3:
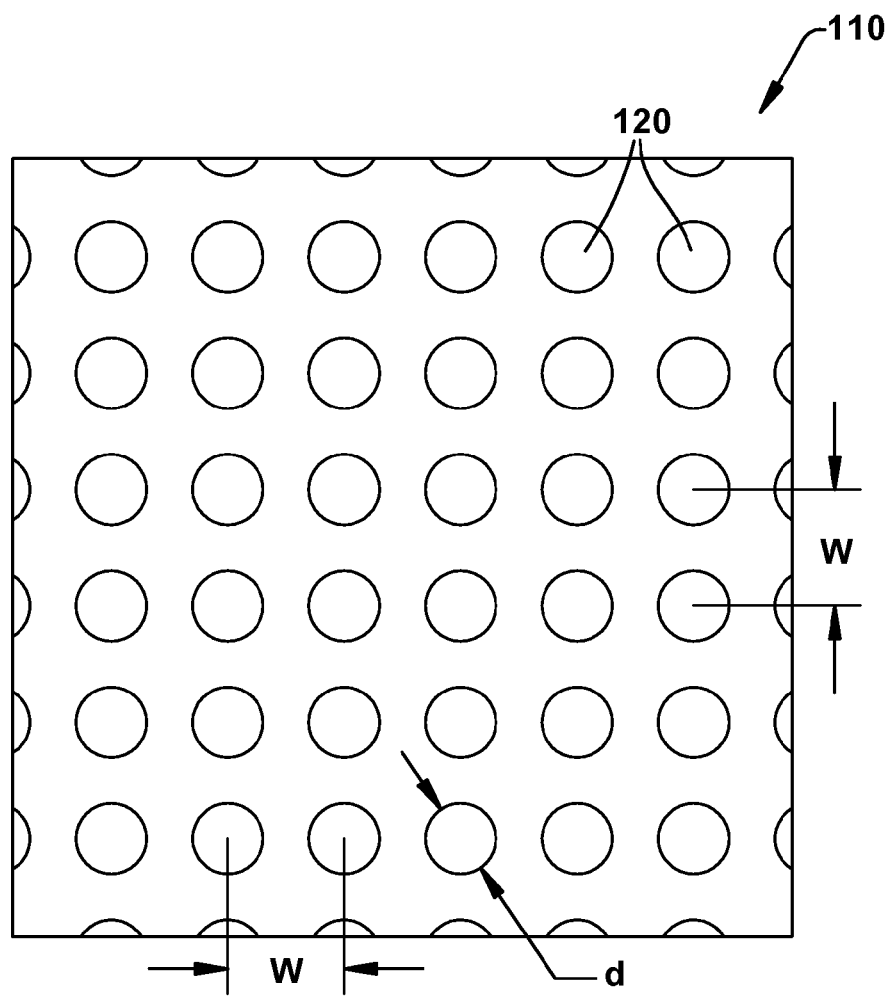
FIG. 3 shows a schematic view of a textured surface in an embodiment of surface textured roller, in accordance with the present invention.

Referring to FIG. 3, a schematic view of surface 110 in an embodiment of surface textured roller is shown in accordance with the aspects of FIG. 2. As described herein, surface 110 of roller 100 may include a plurality of micropores 120 thereon configured to hold lubricant for providing lubrication between roller 100 and an article it may be in contact with. The plurality of micropores 120 may be formed in a predetermined pattern. The pattern may be selected from the group consisting of random, semi-random and an array.

In one embodiment, the predetermined pattern may be an array, i.e., a grid-like pattern, with regular spacing "w" between micropores 120. In an embodiment, the spacing between the plurality of micropores may be in a range from approximately 25 micrometers ($\mu$m) to approximately 150 $\mu$m. In another embodiment, the spacing between the plurality of micropores 120 may be in a range from approximately 80 $\mu$m to approximately 150 $\mu$m. In an embodiment of micropores 120, the diameter of micropores 120 may be in a range from approximately 25 $\mu$m to approximately 75 $\mu$m. In another embodiment, the diameters of micropores 120 may be in a range from approximately 50 $\mu$m to approximately 75 $\mu$m. In an embodiment of micropores 120, the depth of micropores 120 in surface 110 may be in range from 5 $\mu$m to approximately 10 $\mu$m.

In another embodiment, the predetermined pattern may be a grid-like pattern with irregular spacing "w" between micropores 120. Similarly, any number of patterns may be envisaged. One having ordinary skill in the art will recognize that the pattern, diameter, depth, spacing between micropores 120 may be varied depending on the application of roller 100 without any undue experimentation because for example, for smaller size bearings, the area contributed from the textures or the density of the textures in the contact zone may be the same as that for larger size bearings. Correspondingly, the surface textures may be scaled up or down provided other parameters including but not limited to sliding velocity and pressure are approximately the same. Micropores 120 may be formed by manufacturing techniques including but not limited to laser machining, water jet machining, abrasive jet machining, electrochemical machining, electro discharge machining, or a combination thereof. The aforementioned techniques are known in the art and for the sake of clarity, no further discussion is provided.

Figure 4:
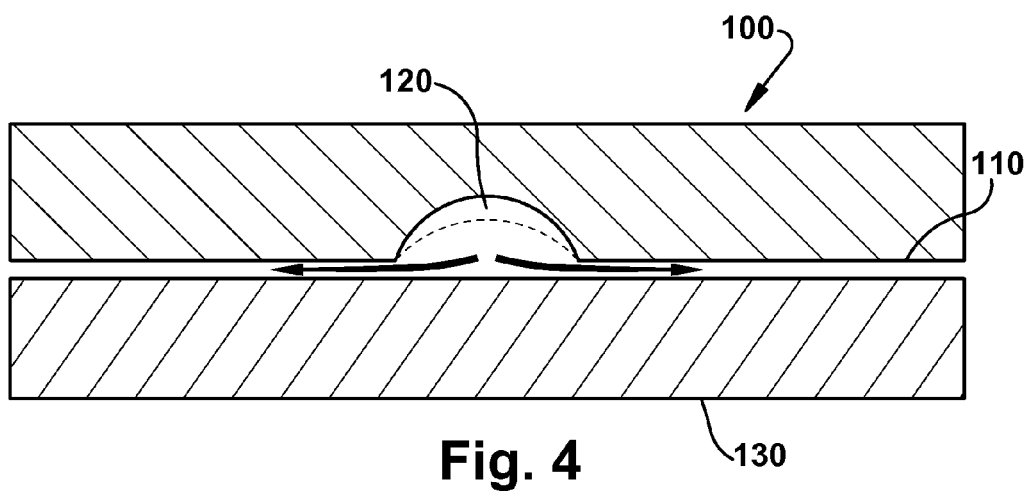
FIG. 4 shows a cross-sectional view of a textured roller surface configured for lubrication in an embodiment of surface textured roller, in accordance with the present invention.
Figure 5:
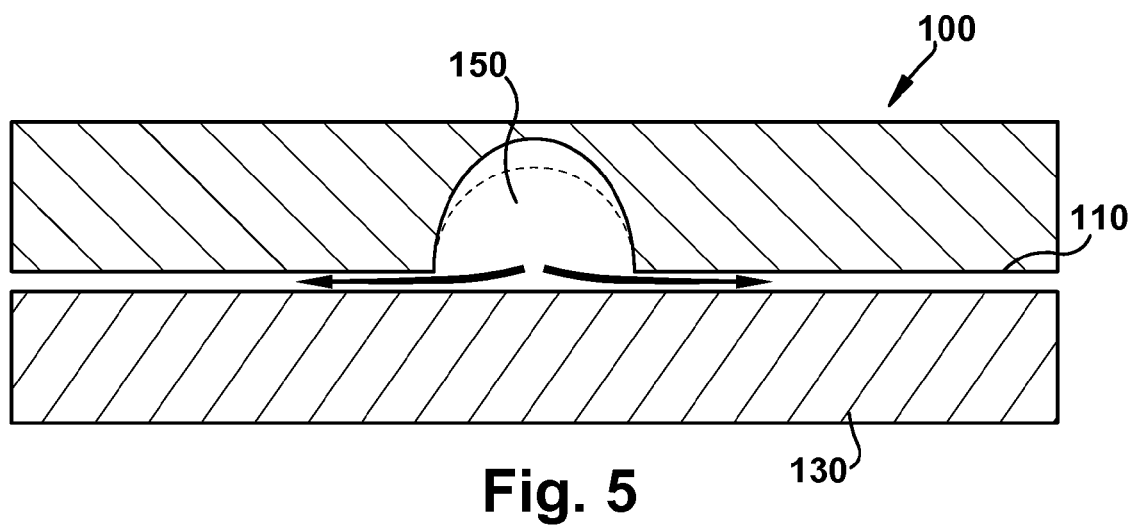
FIG. 5 shows a cross-sectional view of a textured roller surface configured for lubrication in another embodiment of surface textured roller, in accordance with the present invention.
Figure 6:
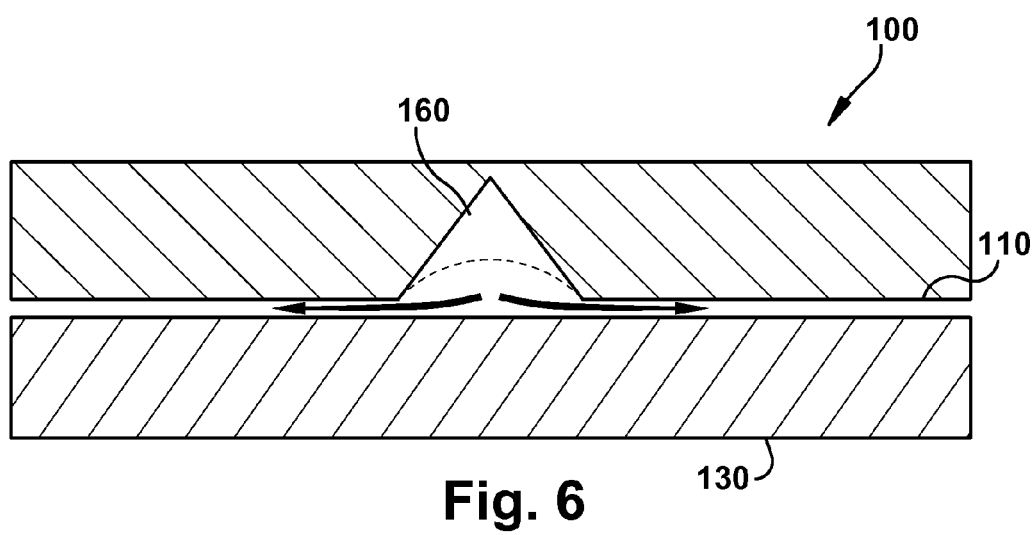
FIG. 6 shows a cross-sectional view of a textured roller surface configured for lubrication in another embodiment of surface textured roller, in accordance with the present invention.

Referring to FIG. 4, FIG. 5, and FIG. 6, (described herein), a cross-sectional view of a textured surface of roller 100 (of which only a portion is illustrated) configured for lubrication in an embodiment of a surface textured roller bearing is shown. In an embodiment, roller 100 may comprise a surface 110 having a plurality of micropores 120. In an embodiment, micropores 120 have a hemisphere geometry. In other embodiments, micropores 120 may have at least a geometry selected from at least one of the group consisting of an ellipsoid 150, a cone 160, and a diamond shape 170 (see FIG. 5, FIG. 6, and FIG. 7 respectively), and combinations thereof. Roller 100 may be configured to mate/be in contact with an article 130 in applications such as wind turbines, gearboxes, etc that operate under high load and low speed conditions as well as racers of a surface textured rolling element described herein. As described herein, micropores 120, 150, 160, and 170 enhance lubrication even in an operating regime where there may be a sufficiently high stress to cause elastic deformation of the surfaces in contact.

During adverse operating conditions, the volume of micropores 120, 150, 160, and 170 may reduce due to pressure or elastic deformation. Micropores 120, 150, 160, and 170 may act as reservoirs of lubricant. When there is an elastohydronamic effect (volume change), micropores 120, 150, 160, and 170 supply lubricant under pressure between the surfaces of roller 100 and article 130. As a result, a lubricant film is sustained between roller 100 and article 130 even under adverse conditions of the machine the foregoing may be components of.

In an embodiment of roller 100, surface 110 having a plurality of micropores 120 may lead to substantial reduction in friction over a wide range covering boundary to mixed lubrication conditions between contact surfaces of roller 100 and article 130. Boundary lubrication occurs when a fluid fails to develop into a complete fluid film, i.e., hydrodynamic lubrication, allowing occasional contact between high points, known as asperities, of sliding wear surfaces. The mixed lubrication regime includes both elastohydrodynamic and boundary lubricated regimes. Plurality of micropores 120 reduce friction over boundary and mixed regimes, with normal lubricants, which do not have additives. Normal lubricants without additives typically may avoid tribochemical reactions leading to degradation of contact surfaces.

Figure 7:
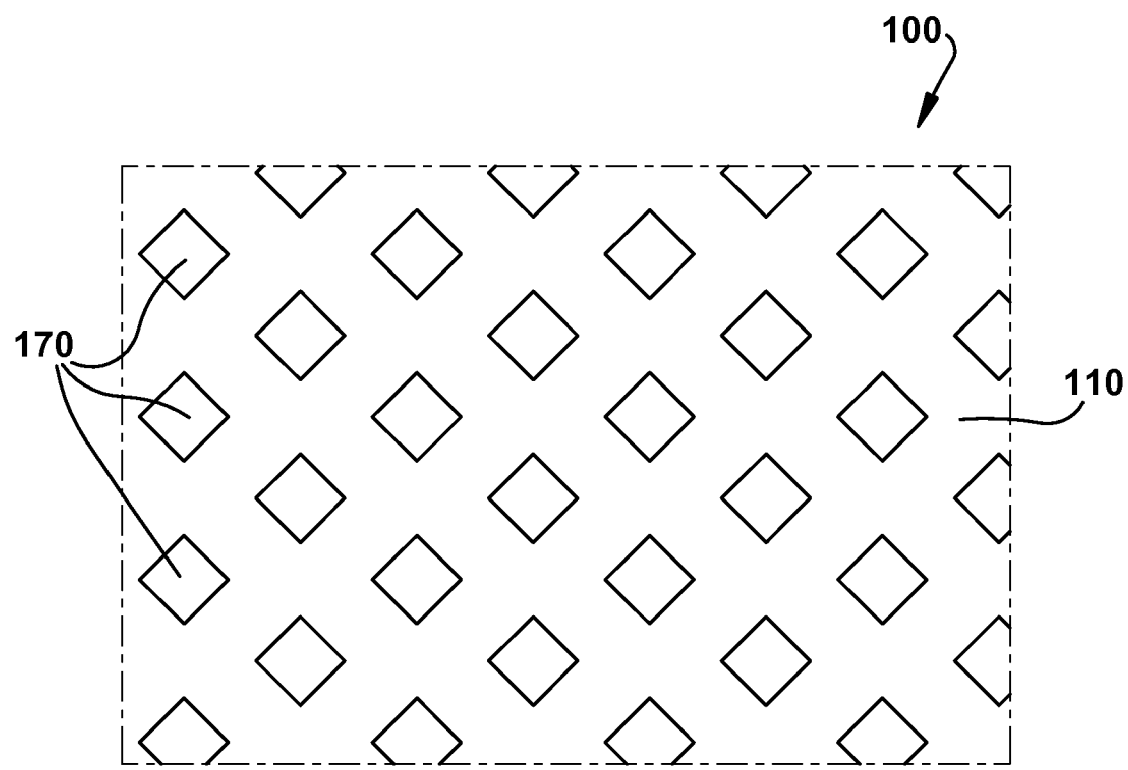
FIG. 7 shows a schematic view of a textured surface in an embodiment of surface textured roller, in accordance with the present invention.

Referring to FIG. 7, a schematic view of surface 110 in an embodiment of surface textured roller is shown. As described herein, surface 110 of roller 100 (not shown in its entirety) may include a plurality of diamond shaped micropores 170 thereof configured to hold lubricant for providing lubrication between roller 100 and an article it may be in contact with.

Figure 8:
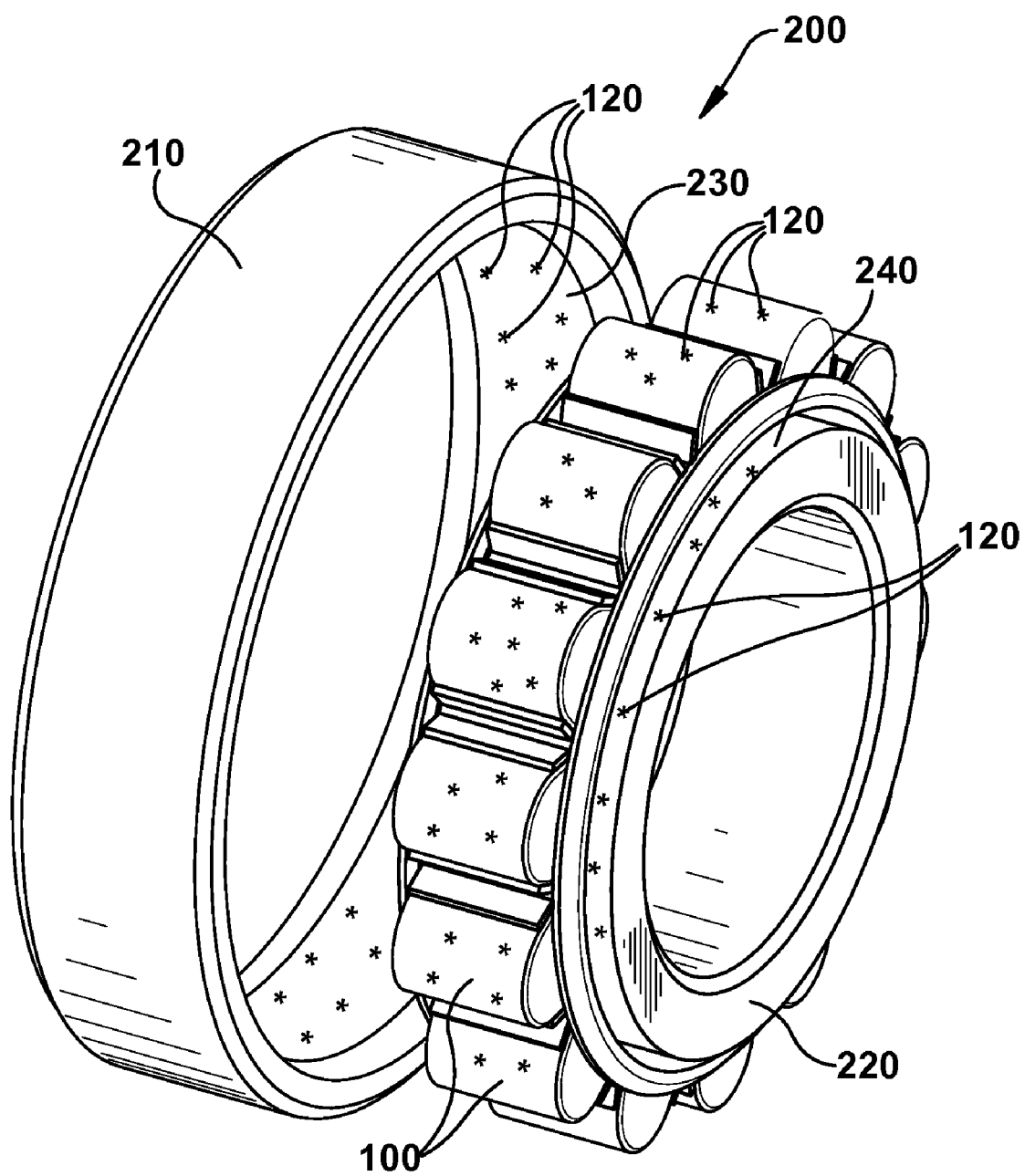
FIG. 8 shows a perspective view of an embodiment of a surface textured rolling element bearing, in accordance with the present invention.

Referring to FIG. 8, a perspective view of an embodiment of a surface textured rolling element bearing 200 is shown in accordance with the aspects of FIG. 2. The element bearing 200 comprises an outer race 210; an inner race 220; and a plurality of rollers 100 between outer race 210 and inner race 220. Surface textured rolling element bearing 200 may additionally comprise a cage, not shown. A rolling element bearing, the components therein, and the interrelation between the foregoing are known to those having ordinary skill in the art, and thus, for the sake of clarity, no further discussion is provided regarding the same.

In an embodiment of surface textured rolling element bearing 200, each roller 100 may comprise a plurality of micropores 120 in a surface thereof. The characteristics and various embodiments of roller 100 are described herein and thus, for the sake of clarity, no further description is provided. In an embodiment, outer race 210 may comprise a plurality of micropores 120 in a surface 230 thereof. In an embodiment, inner race 220 may also comprise a plurality of micropores 120 in a surface 240 thereof. The characteristics and various embodiments of the plurality of micropores 120 are described herein, and equally apply when in use with outer race 210 and inner race 220, and thus, for the sake of clarity, no further description is provided. The same advantages that may be realized in the practice of some embodiments of the surface textured roller 100, and in particular, lubrication advantages offered by micropores 120 thereof and described herein, may also be realized in the practice of some embodiments of the surface textured rolling element bearings 200 described herein, in particular, micropores 120 in the surface 230 of outer race 210 and in the surface 240 of inner race 220 described herein and thus, for the sake of clarity, no further description is provided.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "approximately" used in connection with a quantity is inclusive of the stated value and has the meaning dictated by the context, (e.g., includes the degree of error associated with measurement of the particular quantity). The suffix "(s)" as used herein is intended to include both the singular and the plural of the term that it modifies, thereby including one or more of that term (e.g., the metal(s) includes one or more metals). Ranges disclosed herein are inclusive and independently combinable (e.g., ranges of "up to approximately 25 wt %, or, more specifically, approximately 5 wt % to approximately 20 wt %", is inclusive of the endpoints and all intermediate values of the ranges of "approximately 5 wt % to approximatley 25 wt %," etc).

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A surface textured roller comprising:
   a plurality of micropores in a surface thereof formed in an array, each of the micropores having a geometry including a hemisphere, a diamond shape, an ellipsoid, a cone, or combinations thereof, the plurality of micropores adapted to enhance elastohydrodynamic lubrication of the surface textured roller,
   wherein the array is a substantially uniformly spaced array in the surface of the surface textured roller, and
   wherein at least one of the micropores has the diamond shaped geometry, the diamond shaped geometry including a substantially polygonal perimeter on the surface of the surface textured roller.

2. A surface textured roller according to claim 1, wherein the plurality of micropores comprise the diamond shaped geometry.

3. A surface textured roller according to claim 1, wherein the plurality of micropores comprise a combination of diamond shaped and hemisphere shaped geometries.

4. A surface textured roller according to claim 1, wherein the roller has a dimpled surface and the roller is selected from the group consisting of a cylindrical roller, a spherical roller, and a taper roller.

5. A surface textured roller according to claim 1, wherein the plurality of micropores are adapted to undergo a volume change in response to a pressure being exerted upon the surface textured roller.

6. A surface textured roller according to claim 5, wherein a volume of at least one of the plurality of micropores is reduced in response to the pressure being exerted upon the surface textured roller.

7. A surface textured roller according to claim 1, wherein the plurality of micropores comprise a combination of cone shaped and hemisphere shaped geometries.

8. A surface textured rolling element bearing comprising:
   an outer race;
   an inner race; and
   a plurality of rollers between the outer race and the inner race, the plurality of rollers having a plurality of micropores in a surface thereof formed in an array, each of the micropores having a geometry including a hemisphere, a diamond shape, an ellipsoid, a cone, or combinations thereof, the plurality of micropores adapted to enhance elastohydrodynamic lubrication of the rollers,
   wherein the array is a substantially uniformly spaced array in the surface of the rollers, and
   wherein at least one of the micropores has the diamond shaped geometry, the diamond shaped geometry including a substantially polygonal perimeter on the surface of the rollers.

9. A surface textured rolling element bearing according to claim 8, wherein the plurality of micropores comprise the diamond shaped geometry.

10. A surface textured rolling element bearing according to claim 8, wherein the plurality of micropores comprise a combination of diamond shaped and hemisphere shaped geometries.

11. A surface textured rolling element bearing according to claim 8, wherein the plurality of rollers have a dimpled surface and are selected from the group consisting of a cylindrical roller, a spherical roller, and a taper roller.

12. A surface textured rolling element bearing according to claim 8, wherein the plurality of micropores are adapted to undergo a volume change in response to a pressure being exerted upon the surface textured roller.

13. A surface textured rolling element bearing according to claim 12, wherein a volume of at least one of the plurality of micropores is reduced in response to the pressure being exerted upon the surface textured roller.

14. A surface textured rolling element bearing according to claim 8, wherein the plurality of micropores comprise a combination of cone shaped and hemisphere shaped geometries.

15. A surface textured rolling element bearing according to claim 8, wherein the inner race includes a plurality of micropores in a surface thereof, the plurality of micropores having at least a geometry selected from at least one of the group consisting of a hemisphere, a diamond shape, an ellipsoid, and a cone, and combinations thereof.

16. A surface textured rolling element bearing according to claim 8, wherein the outer race includes a plurality of micropores in a surface thereof, the plurality of micropores having a geometry selected from at least one of the group consisting of a hemisphere, a diamond shape, an ellipsoid, and a cone, and combinations thereof.

17. A surface textured rolling element bearing according to claim 8 additionally comprising a cage.

18. A gearbox comprising:
   a gearbox including a gear set disposed within the gearbox, the gear set including at least two gears meshing with one another; and
   a surface textured roller element bearing supporting the gear set, the surface textured roller element bearing comprising:
   an outer race;
   an inner race; and
   a plurality of rollers between the outer race and the inner race, the plurality of rollers having a plurality of micropores in a surface thereof formed in an array, each of the micropores having a geometry including a hemisphere, a diamond shape, an ellipsoid, a cone, or combinations thereof, the plurality of micropores adapted to enhance elastohydrodynamic lubrication of the rollers,
   wherein the array is a substantially uniformly spaced array in the surface of the rollers, and
   wherein at least one of the micropores has the diamond shaped geometry, the diamond shaped geometry including a substantially polygonal perimeter on the surface of the rollers.

19. A gearbox according to claim 18, wherein the plurality of micropores have a depth of approximately 5 micrometers ($\mu$m) to approximately 10 $\mu$m.

20. A wind turbine comprising:
   a rotor;
   a generator operable to generate power;
   a gearbox provided between the rotor and the generator, the gearbox including a gear set disposed within the gearbox, the gear set including at least two gears meshing with one another; and
   a surface textured rolling element bearing supporting the gear set, the surface textured rolling element bearing comprising:
   an outer race;
   an inner race; and
   a plurality of rollers between the outer race and inner race, the plurality of rollers having a plurality of micropores in a surface thereof formed in an array, each of the micropores having a geometry including a hemisphere, a diamond shape, an ellipsoid, a cone, or combinations thereof, the plurality of micropores adapted to enhance elastohydrodynamic lubrication of the rollers,
   wherein the array is a substantially uniformly spaced array in the surface of the rollers, and
   wherein at least one of the micropores has the diamond shaped geometry, the diamond shaped geometry including a substantially polygonal perimeter on the surface of the rollers.

\* \* \* \* \*